United States Patent
Royster, Jr. et al.

(10) Patent No.: US 7,585,363 B1
(45) Date of Patent: Sep. 8, 2009

(54) METHOD FOR PREPARING NANODISPERSIONS OF FLUORINATED PHTHALOCYANINE PIGMENTS

(75) Inventors: Tommie L. Royster, Jr., Rochester, NY (US); Marina E. Kondakova, Kendall, NY (US); Peter G. Bessey, Clifton Springs, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/260,127

(22) Filed: Oct. 29, 2008

(51) Int. Cl.
C09B 67/50 (2006.01)
C09B 47/04 (2006.01)

(52) U.S. Cl. .................. 106/412; 106/410; 106/411; 106/413; 540/136; 540/137; 540/139; 540/140; 540/141

(58) Field of Classification Search ................ 106/410, 106/411, 412, 413; 540/136, 137, 139, 140, 540/141
See application file for complete search history.

(56) References Cited

U.S. PATENT DOCUMENTS

| | | | |
|---|---|---|---|
| 2,227,628 A | 7/1941 | Calcott | |
| 2,925,423 A * | 2/1960 | Weinmayr | 540/131 |
| 4,209,458 A | 6/1980 | Keller et al. | |
| 4,311,775 A | 1/1982 | Regan | |
| 4,382,033 A * | 5/1983 | Regan | 540/128 |
| 4,548,610 A | 10/1985 | Preiswerk et al. | |
| 4,701,396 A | 10/1987 | Hung et al. | |
| 4,892,941 A | 1/1990 | Dolphin et al. | |
| 5,441,837 A | 8/1995 | Ong et al. | |
| 5,466,796 A * | 11/1995 | Burt et al. | 540/139 |
| 5,500,331 A * | 3/1996 | Czekai et al. | 430/449 |
| 5,614,342 A | 3/1997 | Molaire et al. | |
| 5,679,139 A | 10/1997 | McInerney et al. | |
| 5,679,142 A * | 10/1997 | McInerney et al. | 106/31.6 |
| 5,738,716 A * | 4/1998 | Santilli et al. | 106/31.77 |
| 5,773,181 A | 6/1998 | Molaire et al. | |
| 5,817,805 A | 10/1998 | Gruenbaum et al. | |
| 5,972,089 A * | 10/1999 | Martin | 106/31.89 |
| 6,051,702 A | 4/2000 | Bird et al. | |
| 6,152,999 A | 11/2000 | Erdtmann et al. | |
| 6,153,000 A | 11/2000 | Erdtmann et al. | |
| 6,238,931 B1 * | 5/2001 | Buechler et al. | 436/546 |
| 6,511,971 B1 * | 1/2003 | Gorun | 514/183 |
| 6,715,869 B1 * | 4/2004 | Reem et al. | 347/100 |
| 6,726,755 B2 | 4/2004 | Titterington et al. | |
| 6,949,139 B2 | 9/2005 | Molaire et al. | |
| 6,964,844 B1 * | 11/2005 | Buechler et al. | 435/6 |
| 7,008,742 B2 * | 3/2006 | Molaire | 430/59.5 |
| 7,083,984 B2 * | 8/2006 | Buechler et al. | 436/518 |
| 7,382,514 B2 | 6/2008 | Hsu et al. | |
| 2002/0117080 A1 | 8/2002 | Okutsu et al. | |
| 2003/0027893 A1 * | 2/2003 | Campbell et al. | 523/160 |
| 2004/0030125 A1 | 2/2004 | Li et al. | |
| 2005/0159595 A1 * | 7/2005 | Molaire | 540/141 |
| 2005/0272831 A1 * | 12/2005 | Wang et al. | 523/160 |
| 2006/0014855 A1 | 1/2006 | House et al. | |
| 2006/0070651 A1 | 4/2006 | Kang et al. | |
| 2006/0112856 A1 | 6/2006 | Brychcy et al. | |
| 2006/0204885 A1 | 9/2006 | Molaire et al. | |
| 2008/0112068 A1 | 5/2008 | Helber et al. | |
| 2008/0112069 A1 | 5/2008 | Helber et al. | |

FOREIGN PATENT DOCUMENTS

| | | |
|---|---|---|
| CN | 1150261 | 5/1997 |
| CN | 101081942 | 12/2007 |
| DE | 197 35 738 | 7/2004 |
| EP | 0 889 097 | 6/2005 |
| JP | 2003-241374 | 8/2003 |
| JP | 2004-027016 A * | 1/2004 |
| JP | 2005-298490 A * | 10/2005 |
| JP | 2007/321107 | 12/2007 |
| JP | 2007/321110 | 12/2007 |
| JP | 2007/321111 | 12/2007 |
| WO | 87/07267 | 12/1987 |
| WO | 2005/033110 | 4/2005 |
| WO | 2005/047962 | 5/2005 |
| WO | 2007/088662 | 8/2007 |

OTHER PUBLICATIONS

*American Chemical Society*, Langmuir 1999, 15, pp. 5227-5231, Hughes et al, "Stability of Copper Phthalocyanine Dispersions in Organic Media".
*J.FluorineChem*, vol. 12 (1978) pp. 73-77, "The Synthesis Of A Fluorinated Phthalocyanine" Keller et al.
*Inorganic Chemistry*, vol. 8, 2018 (1969), Jones et al., "A Fluorinated Iron Phthalocyanine".
*J.App.Physics*, vol. 93, No. 12 (2003) pp. 9683-9692.
* cited by examiner

*Primary Examiner*—Anthony J Green
(74) *Attorney, Agent, or Firm*—Raymond L. Owens

(57) ABSTRACT

A method for preparing a nanodispersion comprising the steps of: (i) introducing into a milling apparatus a solid fluorinated phthalocyanine pigment according to Formula (I):

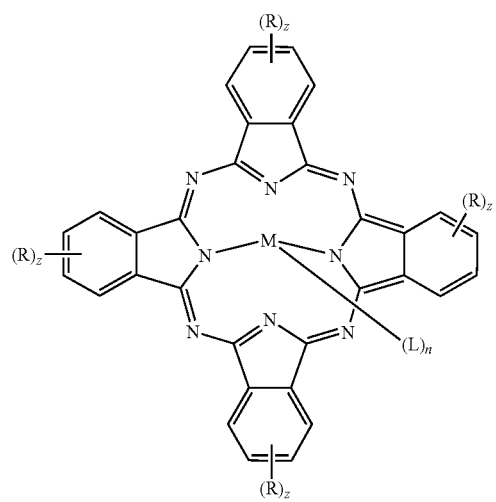

Wherein M is a metal cation chosen from Groups 1b, 2b, 2a or 3a of the Periodic Table of the Elements; R is fluorine, a perfluoroalkyl or a perfluoroaryl group; z is 1 to 4; L is an anionic ligand; and n is 0 or 1 such that the overall charge on the molecular unit is neutral; followed by milling with agitation the solid fluorinated phthalocyanine in an organic solvent into a suspension of particles so that at least 80 volume % of the particles have a particle size of less than 100 nm.

14 Claims, 2 Drawing Sheets

METHOD FOR PREPARING NANODISPERSIONS OF FLUORINATED PHTHALOCYANINE PIGMENTS

CROSS REFERENCE TO RELATED APPLICATIONS

Reference is made to commonly assigned U.S. patent application Ser. No. 12/260,195, filed Oct. 29, 2008 entitled "Color Filter Element With Improved Colorant Dispersion" by Alessi et al and U.S. patent application Ser. No. 12/260,344, filed Oct. 29, 2008 entitled "Fluorinated Bis-(Phthalocyanylaluminoxy)Silyl Pigments" by Diehl et al. All cases cross the disclosures of which are incorporated herein.

FIELD OF THE INVENTION

This invention relates to the preparation of nanodispersions of fluorinated phthalocyanine pigments in organic solvents.

BACKGROUND OF THE INVENTION

Pigments are solid materials that are relatively insoluble and are used to impart color. Metal phthalocyanines, including aluminum phthalocyanines, are one well-known class of pigments and can be used in a wide variety of applications. For example, metal phthalocyanines have been used in ink-jet formulations (including U.S. Pat. No. 6,153,000, U.S. Pat. No. 6,726,755, US Appl. No. 2006014855, U.S. Pat. No. 5,679,139, DE19735738 and U.S. Pat. No. 6,152,999), electrophotography (including U.S. Pat. No. 4,701,396), color filter arrays (including US Appl. No. 20080112068 and US Appl. No. 20080112069), photoconductive imaging (including U.S. Pat. No. 5,441,837), photoactivator formulations (including U.S. Pat. No. 4,548,610), optical recording media (including EP 889097), electrophoretic displays (including U.S. Pat. No. 7,382,514 and WO2005047962), magnetophoretic or electromagnetophoretic displays (including US Appl. No. 20040030125) and dye sensitized solar cells (including US Appl. No. 2006070651).

U.S. Pat. No. 4,311,775 discloses bis-aluminum phthalocyanines, prepared using dichlorodiphenylsilane which is a flammable liquid that can violently react with water to produce hydrogen chloride gas, that are bridged with one or more siloxane group as useful pigments for electrographical and photoelectrographic process. This reference also describes the suspension of such pigments in organic solvents. U.S. Pat. No. 5,817,805 discloses a synthetic method using dichlorodiphenylsilane for the preparation of bis(phthalocyanylalumino)tetraphenyldisiloxanes, including those in which the phthalocyanine group can contain halo groups. U.S. Pat. No. 5,773,181 discloses the preparation of mixtures of unsymmetrical metal phthalocyanines which are not bridged and require 2 or more different substituents on the phthalocyanine where the metal can be aluminum and the phthalocyanine group can be substituted with fluorine. In this reference, the pigment is dry-milled and then suspended in a highly crystalline state in an organic solvent with a $\gamma_c$ hydrogen bonding parameter less than 9.0 with further milling.

U.S. Pat. No. 4,701,396 discloses unbridged titanyl fluorophthalocyanines. Other references that disclose fluorinated titanyl phthalocyanines are U.S. Pat. No. 6,949,139, U.S. Pat. No. 5,614,342 and US 20060204885. US20040030125 discloses silyl phthalocyanines including bridged bis-species and where the phthalocyanine groups contain low molecular weight fluorinated polymeric moieties.

US 20020117080 discloses pigments consisting of mixtures of copper and aluminum phthalocyanines where the phthalocyanine groups have been randomly chlorinated or brominated.

Fluorinated non-metal phthalocyanines or unbridged metal phthalocyanines have also been disclosed in Jones et al, Inorg. Chem., Vol 8, 2018 (1969); Keller et al, J. Fluorine Chem., 13, 73 (1975); Peisert et al, J. Appl. Physics, 93(12), 9683 (2003); U.S. Pat. No. 6,051,702; U.S. Pat. No. 4,892,941; U.S. Pat. No. 2,227,628 and WO2005033110. Methods for making fluorinated phthalonitriles, often used as a precursor to the phthalocyanine group, include U.S. Pat. No. 4,209,458 and WO1987007267.

While pigments are sometimes used directly as colorants, they are often dispersed in a solvent. For many uses, it is highly desirable for the pigment to form very small solid particles with a high surface area and desirably, uniform particle size distribution. This maximizes light absorption and minimizes light scatter. Such compositions are commonly referred to as nanoparticle dispersions or nanodispersions. Methods to prepare nanodispersions are well known in the art and include JP2007321111, JP2007321110, JP2007321107, CN101081942, K. Hayashi et al, J. Materials Chemistry, 17(16), 527-530 (2007), WO2007088662, US Appl. No. 20060112856, CN1150261, JP2003241374 and D. F Hughes et al, Langmuir, 15(16), 5227-5231 (1999).

Notwithstanding all these developments, there remains a need to find dispersions of cyan or blue-green pigments with improved properties, particularly dispersability in organic solvents, while maintaining good hue and environmental stability.

SUMMARY OF THE INVENTION

It is therefore an object of the present invention to provide a method of preparing nanodispersions of fluorinated phthalocyanines in organic solvents by milling. In particular, the method comprises the steps of:

(i) introducing into a milling apparatus a solid fluorinated pthalocycanine pigment according to Formula (I):

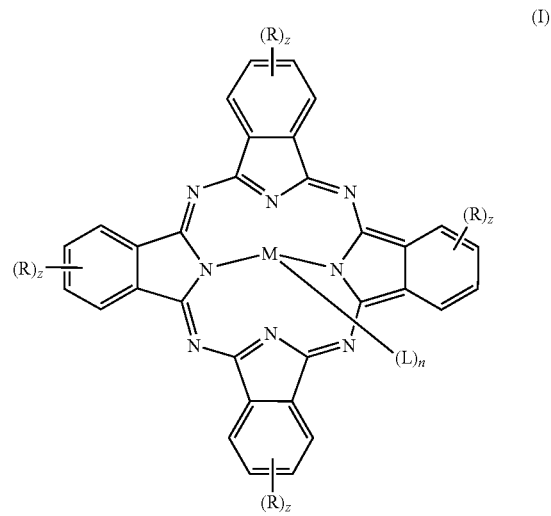

wherein:

M is a metal cation chosen from Groups 1b, 2b, 2a or 3a of the Periodic Table of the Elements;

R is fluorine, a perfluoroalkyl or a perfluoroaryl group;

z is 1 to 4;

L is an anionic ligand; and n is 0 or 1 such that the overall charge on the molecular unit is neutral; and (ii) milling with agitation the solid fluorinated phthalocyanine in an organic solvent into a suspension of particles so that at least 80 volume % of the particles have a particle size of less than 100 nm.

Nanodispersions with very small and uniform particle sizes are readily and easily formed from pigments according to Formula (I) in organic solvents.

DETAILED DESCRIPTION OF THE INVENTION

Figure 1:
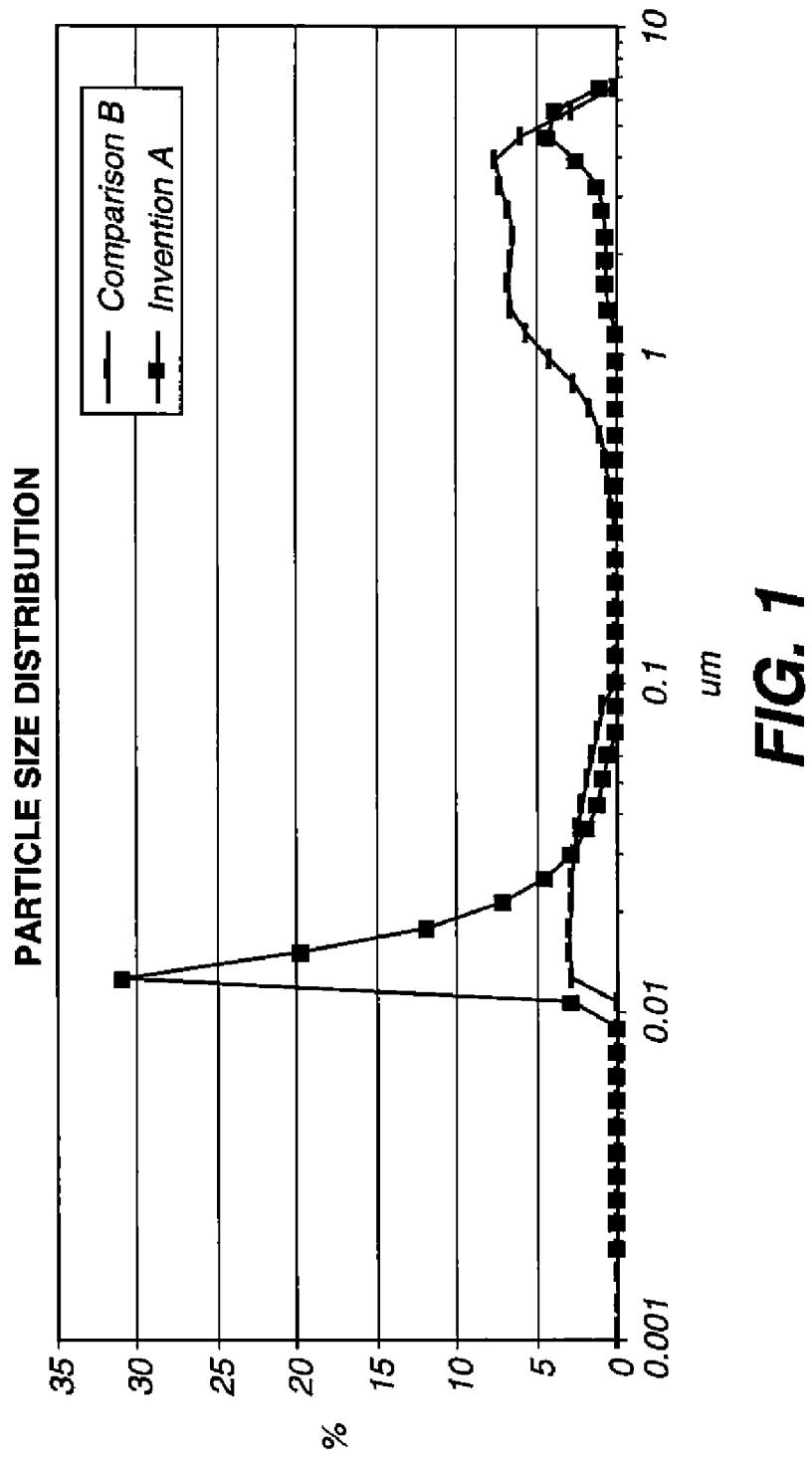
FIGS. 1 and 2 show the particle size distribution for comparative and inventive nanodispersions formed in organic solvents.

The milling that has been used in the art to prepare dispersions of pigments, for example for color filter applications, commonly produces material with a wide range of particle sizes up to 500 nm. It has been found that fluorinated phthalocyanine pigment particles readily mill to a narrow particle size range, where the particle size is predominantly less than 100 nm, and results in improved spectral properties. One method for producing particles of this type has been taught by Santilli et al. in U.S. Pat. No. 5,738,716, and by Czekai et al. in U.S. Pat. No. 5,500,331, the contents of which are incorporated herein by reference. This method will be referred to herein as micromedia milling. The inventive material also permits use of standard milling methods to produce nanodispersions. The process of preparing dispersions from pigments commonly involves three steps: (a) a milling and dispersing step to form and disperse small particles of the pigment; (b) a dilution or mixing step in which the dispersed pigment concentrate is diluted with a carrier and other addenda, which can include other pigment dispersions, to form a coating-strength pigment dispersion; and (c) forming a deposit of the coating-strength pigment dispersion onto a substrate. Step (a) can be further detailed as: (a1) providing a pigment mixture containing a pigment and a carrier for the pigment, and optionally a dispersant; (a2) mixing the pigment mixture with milling media; (a3) introducing the mixture into a high-speed mill; (a4) milling the mixture to obtain a pigment dispersion wherein the pigment particles have the desired size; and (a5) separating the dispersion from the milling media.

In the milling step, the pigment is usually suspended in a carrier (typically the same carrier as that in the coating-strength slurry) along with rigid, inert milling media. Mechanical energy is supplied to this pigment dispersion, and the collisions between the milling media and the pigment cause the pigment to deaggregate into its primary particles and fracture primary particles into smaller particles. A dispersant or stabilizer, or both, is commonly added to the pigment dispersion to facilitate dispersing smaller particles of the raw pigment, and to maintain colloidal particle stability, i.e. retarding particle reaggregation and settling.

There are many different types of materials which can be used as milling media, such as glasses, ceramics, metals, and plastics. In useful embodiments, the grinding media can comprise particles, preferably substantially spherical in shape, e.g., beads, consisting essentially of a polymeric resin or ceramic particles such as those composed of zirconium silicate.

In general, polymeric resins suitable for use as milling media are chemically and physically inert, substantially free of metals, solvent, and monomers, and of sufficient hardness and friability to enable them to avoid being chipped or crushed during milling. Desirably the polymeric resin beads have sizes in the range of 10 to 100 microns, as described by Czekai et al. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly(tetrafluoroethylenes), e.g., Teflon™, and other fluoropolymers, high density polyethylenes, polypropylenes, cellulose ethers and esters such as cellulose acetate, poly(hydroxyethyl methacrylate), poly(hydroxyethyl acrylate), silicone containing polymers such as polysiloxanes and the like. The polymer can be biodegradable. Exemplary biodegradable polymers include polylactides, polyglycolids, copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm$^3$. Higher density resins are especially useful inasmuch as these resins transfer more energy to provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill, a vibratory mill, a planetary mill, a sand mill, and a bead mill. A high speed mill is particularly useful. By high speed mill, it is meant a milling device capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, in Cowles-type saw tooth impeller having a diameter of 40 mm when operated at 9,000 rpm. Useful proportions of the milling media, the pigment, the liquid dispersion medium and dispersant can vary within wide limits and depends, for example, upon the particular material selected and the size and density of the milling media. The process can be carried out in a continuous or batch mode.

In batch milling, a slurry of <100 μm polymeric resin milling media, liquid, pigment, and dispersant is prepared using simple mixing. This slurry can be milled in conventional high energy batch milling processes such as high speed attritor mills, vibratory mills, ball mills. This slurry is milled for a predetermined length of time to permit comminution of the active material to a minimum particle size. After milling is complete, the dispersion of active material is separated from the milling media by a simple sieving or filtration with a barrier to the milling media but not the milled pigment, e.g. a filter with a pore size of 5 μm.

In continuous media recirculation milling, a slurry of <100 μm polymeric resin milling media, liquid, pigment, and dispersant can be continuously recirculated from a holding vessel through a conventional media mill which has a media separator screen adjusted to >100 μm to permit free passage of the media throughout the circuit. After milling is complete, the dispersion of active material is separated from the milling media by simple sieving or filtration.

With either of the above modes the useful amounts and ratios of the ingredients of the mill grind will vary widely depending upon the specific materials. The contents of the milling mixture comprise the mill grind and the milling media. The mill grind comprises pigment, dispersant and a liquid carrier which for this invention is an organic solvent. For filter slurries, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles or Hockmeyer et al.

The dispersant is another important ingredient in the mill grind. Useful dispersants include Solsperse 41000 (The Lubrizol Corporation) or other compositions sold under the Solsperse brand name, sulfates (e.g. sodium dodecyl sulfate), sulfonates (e.g. N-methyl-N-oleoyl taurate), acrylic and styrene-acrylic copolymers such as those disclosed in U.S. Pat. Nos. 5,085,698 and 5,172,133 (e.g. Joncryl 678), and sulfonated polyesters and styrenics such as those disclosed in U.S. Pat. No. 4,597,794. Also useful are phosphorated polyesters such as Disperbyk-111 (BYK-Chemie GmbH, Germany) and Disperbyk-161 (BYK-Chemie GmbH, Germany) which contains amine functional groups. Also useful are dispersion agents that contain polyether functional groups or acidic functional groups such as carboxylic acid. Other patents referred to above in connection with pigment availability also disclose a wide variety of useful dispersants.

The milling time can vary widely and depends upon the pigment, mechanical structure, residence conditions, along with the initial and desired final particle size. For mill grinds using the useful pigments, dispersants, and milling media described above, milling times will typically range from 1 to 100 hours. The milled pigment concentrate is conveniently separated from the milling media by filtration.

The carrier for the pigment is a non-aqueous solvent. Useful solvents have been disclosed by Czekai et al., and also in U.S. Pat. No. 5,145,684, U.S. Pat. No. 5,679,138, and EP 498,492, the disclosures of which are incorporated herein by reference. The carrier medium may be an aqueous solvent mixture comprising water and at least one water-miscible organic co-solvent. Selection of a suitable mixture depends on requirements of the specific application, such as desired surface tension and viscosity, the selected pigment, drying time of the color filter layer, and the type of material onto which the pigment dispersion will be coated. Representative examples of water-miscible co-solvents that can be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofuryl alcohol; (2) ketones or ketoalcohols such as acetone, methyl ethyl ketone, and diacetone alcohol; (3) ethers, such as tetrahydrofuran and dioxane; (4) esters, such as ethyl acetate, ethyl lactate, ethylene carbonate, and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol, and thioglycol; (6) lower alkyl mono- or di-ethers derived from alkylene glycols, such as ethylene glycol mono-methyl (or -ethyl) ether, diethylene glycol mono-methyl (or -ethyl)ether, propylene glycol mono-methyl (or -ethyl)ether, triethylene glycol mono-methyl (or -ethyl)ether, and diethylene glycol di-methyl (or -ethyl)ether; (7) nitrogen containing cyclic compounds, such as pyrrolidone, N-methyl-2-pyrrolidinone, and 1,3-dimethyl-2-imidazolidinone; and (8) sulfur-containing compounds such as dimethyl sulfoxide and tetramethylene sulfone. For dispersions containing water, it is preferred that the water-miscible organic co-solvent be at least 50% of the mixture.

However, it is most preferred to use organic solvents that are not water-miscible and contain no more than 10% water. Useful non-aqueous solvents include ketones, amides, hydrocarbons, chlorinated hydrocarbons, alcohols, polyols, ethers, and esters. Solvents known to be useful for this process include toluene, hexane, cyclohexanone, N-methylpyrrolidinone, ethanol, butanol, glycol, and PGMEA (propylene glycol monomethyl ether acetate). A single solvent or mixtures of solvents may be used. Of these, organic solvents with a $\gamma_c$ hydrogen bonding parameter of 8.0, or preferably 9.0, or greater are preferred. Some examples of preferred types of solvent with high gamma hydrogen bonding parameters are ketones and esters. A particularly suitable solvent mixture is cyclohexanone and PGMEA. The $\gamma_c$ hydrogen bonding parameter can be determined by the method reported by J. Crowley, G. S. Teague and J. W. Lowe, Journal of Paint Technology, 38(496), 269-280 (1966) and as further described in CRC Handbook or Solubility Parameters and Other Cohesion Parameters, A. Barton, CRC Press, Boca Raton, Fla., 1983, pp 174 and 179-180 and in the ASTM D3132 standard test method.

The fluorinated phthalocyanine pigments of the invention are exceptionally useful with non-aqueous organic solvents. In organic media, fluorinated phthalocyanine pigments readily mill to small particle sizes with a narrow particle size distribution. This treatment results in pigment particles wherein at least 80 volume % of the particles, and preferably 90 volume %, have a particle size less than 100 nm. It is suitable that at least 75 volume %, and preferably 80 volume %, of the particles have a particle size less than 30 nm. Preferred are dispersions wherein at least 70 volume % of the particles, and preferably 75 volume %, have a particle size less than 22 nm. Most preferred are those dispersions wherein at least 65 volume % of the particles, and preferably 70 volume %, have a particle size less than 18 nm.

Commercially available metallophthalocyanine pigments such as pigment blue 15 (copper phthalocyanine) and hydroxyaluminum phthalocyanine have blue or blue-green hues. Another class of phthalocyanine pigments is the bridged aluminum phthalocyanines as described by Regan in U.S. Pat. No. 4,311,775, the contents of which are incorporated herein by reference. A particular example of a non-fluorinated siloxane-bridged aluminum phthalocyanine is bis(phthalocyanylalumino)tetraphenyldisiloxane. While phthalocyanine pigment dispersions in both aqueous and organic solvent are well-known, it is often difficult to form nanodispersions from these materials. Known dispersion techniques often yield dispersions whose particle sizes are relatively large and non-uniform in terms of particle size distribution.

A fluorinated phthalocyanine of the invention is defined as one containing a phthalocyanine group that is substituted directly by either fluorine or by perfluorinated groups. It does not refer to phthalocyanine molecules with fluorine or fluorine containing groups elsewhere in the molecule. For example, a fluoride ion or a perfluoroctanoxide group coordinated to the metal atom of a metallized phthalocyanine would not be a fluorinated phthalocyanine of the invention. The fluorinated phthalocyanine pigments of the invention are cyan or blue-green in color; that is, they have a maximum absorbance in the region of 600-700 nm.

It should be noted that the fluorinated phthalocyanine pigments of the invention as synthesized may contain solvents (generally less than 10% by weight) that are either physically entrapped or in some cases coordinated as solute molecules. These small amounts of solvents generally do not affect dispersion preparation.

The fluorinated phthalocyanines according to the invention are according to Formula (I):

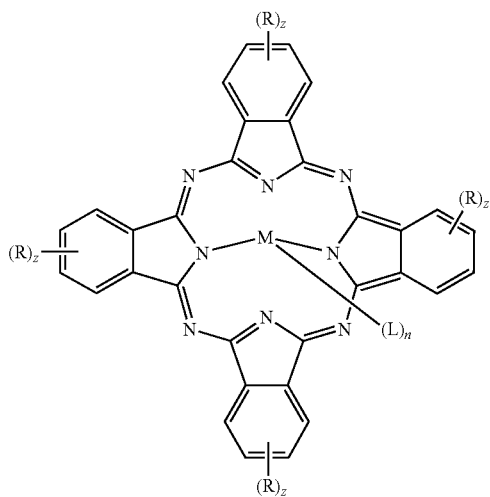

wherein:

M is a metal cation chosen from Groups 1b, 2b, 2a or 3a of the Periodic Table of the Elements;

R is fluorine, a perfluoroalkyl or a perfluoroaryl group;

z is 1 to 4;

L is an anionic ligand; and n is 0 or 1 such that the overall charge on the molecular unit is neutral.

M is a metal cation chosen from Groups 1b, 2b, 2a or 3a of the Periodic Table of the Elements so that the metal cation is at least divalent. The most suitable metal cations are $Cu^{+2}$ and $Al^{+3}$. Of these, $Al^{+3}$ is preferred.

R represents a fluoro, a perfluoroalkyl or a perfluoroaryl substituent on each of the four phenyl groups in the phthalocyanine ring system. Specific examples of perfluoroalkyl groups include trifluoromethyl, $—C_2F_5$ and $—C_8F_{17}$. A specific example of a perfluoroaryl group is pentafluorophenyl. Of these, fluoro and trifluoromethyl are preferred with fluoro being most preferred.

z represents the number of fluorine containing substituents on the phthalocyanine group and can range from 1 to 4 per phenyl group. It should be appreciated that when z=1, 2 or 3, there is a possibility of isomers where the substituents of each phenyl ring of the four total present in the phthalocyanine group may not be in the same relative position in every phenyl ring. One method of preparing a substituted phthalocyanine group is from a substituted phthalonitrile. Phthalonitrile and the subsequent portion of the phthalocyanine group derived from it have the following numbering system:

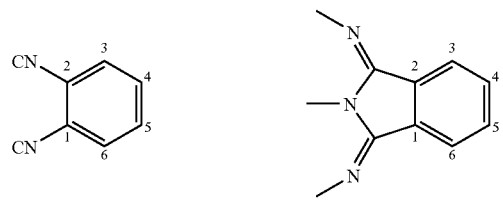

For example, pigments derived from either 3,6-difluorophthalocyanine or 4,5-difluorocyanine (z=2) will be symmetrical in terms of the phthalocyanine group and have only one isomer. However, pigments derived from 3,5-difluorophthalonitrile may not be symmetrical and isomers may arise since each individual phenyl group of the four in the phthalocyanine group may be substituted in either the 3,5 or the 4,6 positions. Whenever z=1-3, all possible individual isomers and mixtures of isomers in any combination are part of the invention.

One preferred pigment according to Formula (I) is where z=2 so that each phthalocyanine group has 8 substitutents in all. However, the most preferred pigment according to Formula (I) is where z=1 where each phthalocyanine group has 4 substitutents in all. The preferred substitution pattern for when z=1 is the 3- or 4-position as derived from 3-(substituted) phthalonitrile or 4-(substituted) phthalonitrile respectively. As above, all possible individual isomers and mixtures of isomers (in terms of fluorine location) in any combination are part of the invention.

L is an anionic ligand chosen so that the entire metallized phthalocyanine molecular unit is neutral. Phthalocyanine anions have a net −2 charge so that when the metal is divalent, the complex is neutral and no L is present (n=0). This is the case for when M is $Cu^{+2}$. When the metal is trivalent, one L is present and n=1. This is the case when M is $Al^{+3}$. Suitable monoanionic L groups include halides such as fluoride, chloride, bromide, hydroxide, phenoxide and thiophenoxide. L can also represent a bridging ligand that connects two independent phthalocyanine units. Suitable dianionic L groups include —O—, —OCH$_2$CH$_2$O—, —O—Si(R)$_2$—O—, —O—Si(R)₂—O—Si(R)₂—O—, —O—Si(R)₂—R—Si(R)₂—O— and —O—P(R)₂—O—P(R)₂—O— where R is alkyl or aryl, particularly phenyl. The R groups may be chosen independently; that is, they may be the same or different. For all types of L, halo, hydroxide, —O—, —O—Si(R)₂—O—Si(R)₂—O—, and O—Si(R)₂—R—Si(R)₂O— are preferred with —O—Si(R)₂—O—Si(R)₂—O— and O—Si(R)₂—R—Si(R)₂—O— being most preferred. When L is a bridging ligand, the phthalocyanine units can be the same or different. When the phthalocyanine units are different, it is not necessary that both phthalocyanine units are fluorinated.

Preferred pigment types are those according to Formula (II):

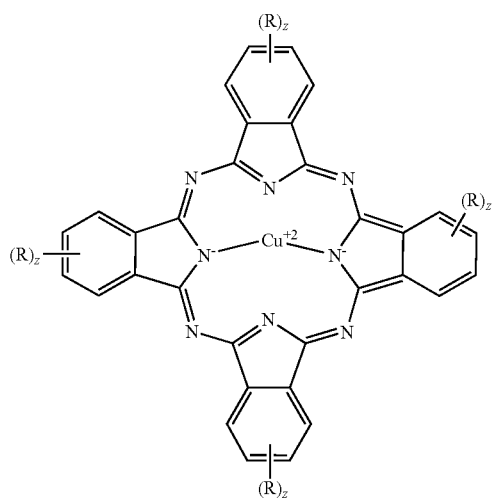

(II)

wherein R is fluoro or trifluoromethyl and z is 1-4. Of this type, the most preferred structures are where z is 1 and when R is fluoro.

Another preferred pigment type is those according to Formula (III):

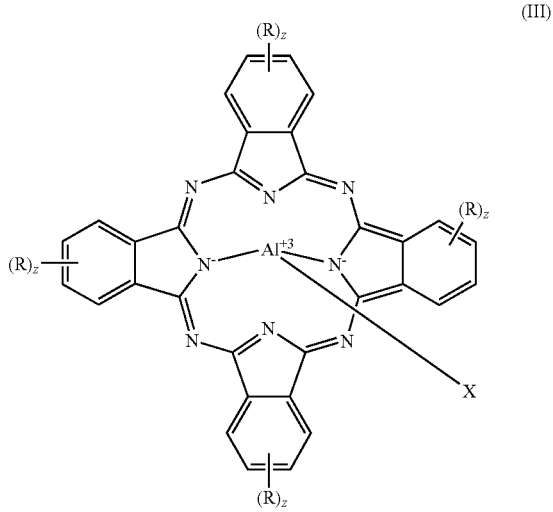

(III)

wherein R is fluoro or trifluoromethyl, z is 1-4 and X is a halide, hydroxide, —O— or —O—Si(R)₂—O—Si(R)₂—O— where the substituents on the Si atom are alkyl or aryl, particularly phenyl. Of these X groups, the bridging ligand —O—Si(R)₂—O—Si(R)₂—O— is highly preferred.

Specific examples of inventive pigments include, but are not limited to, the following:

Inv-1

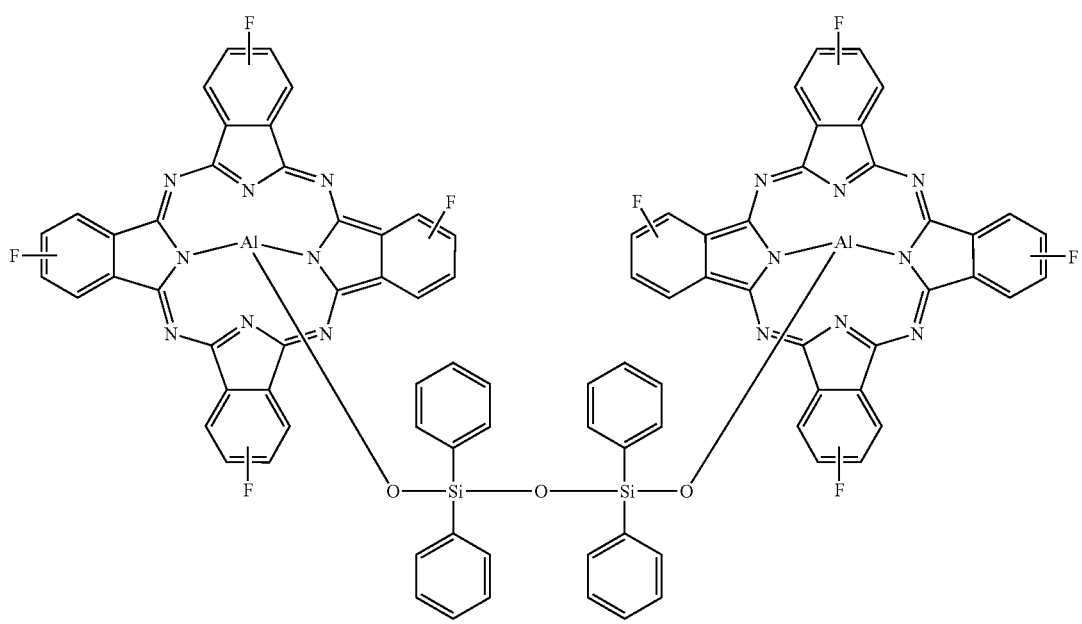

-continued
Inv-2
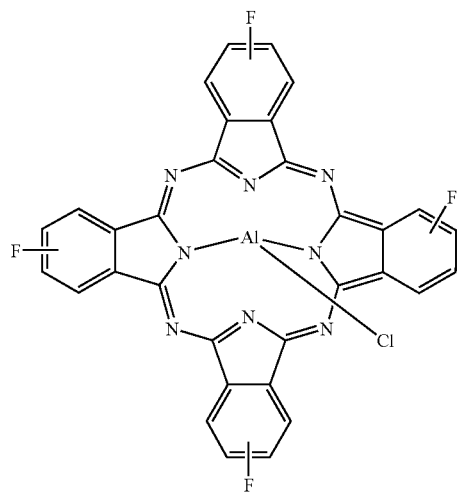
Inv-3
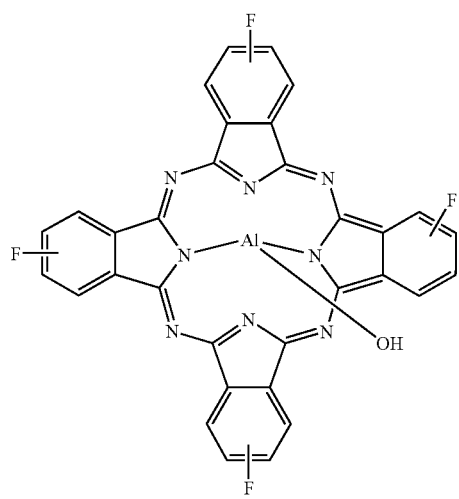
Inv-4
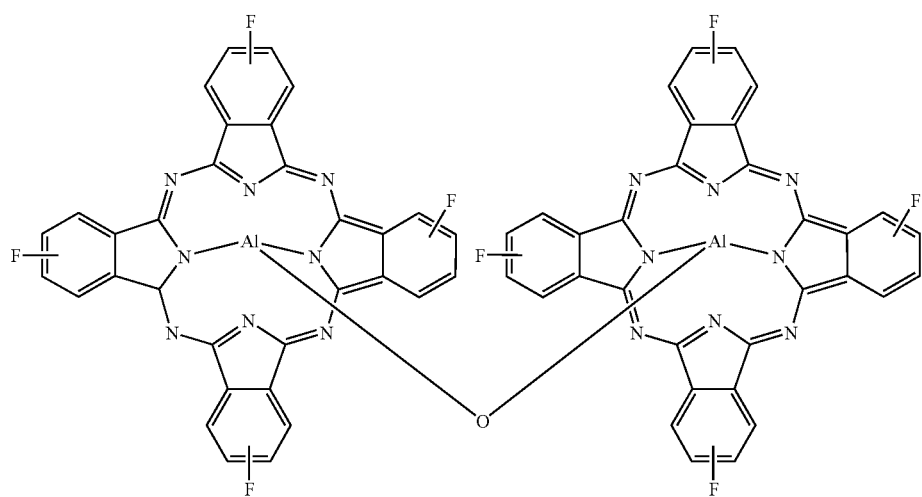

-continued
Inv-5
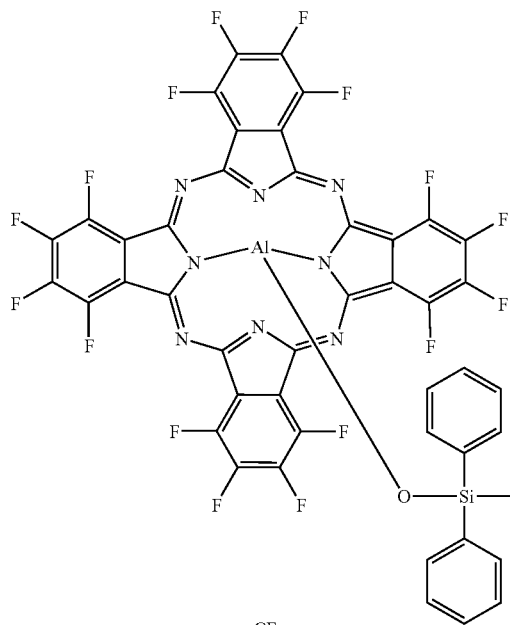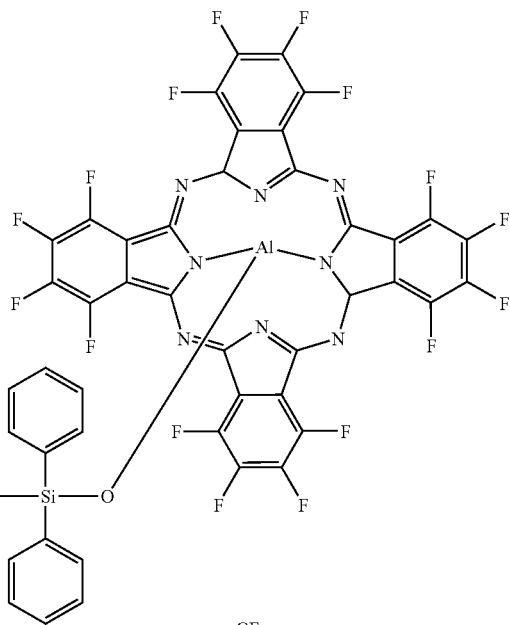
Inv-6
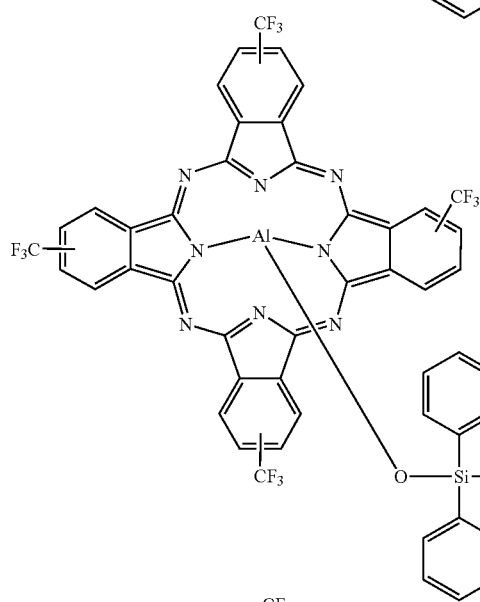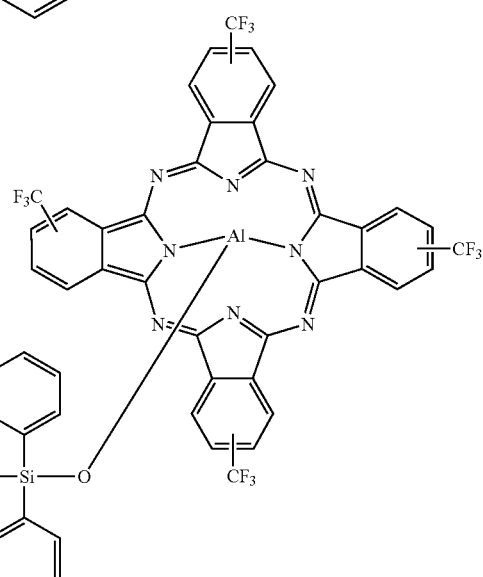
Inv-7
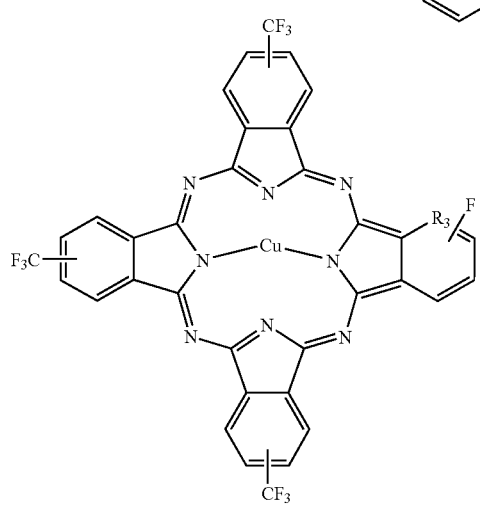

-continued
Inv-8
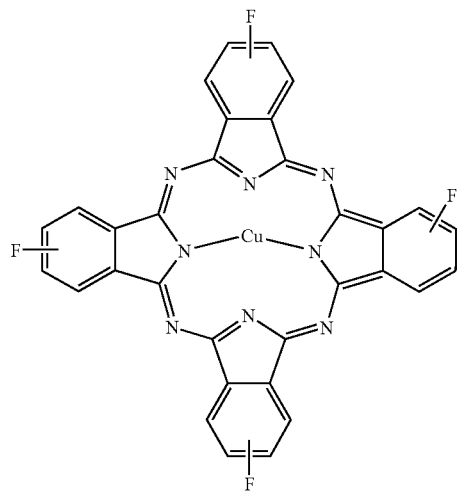
Inv-9
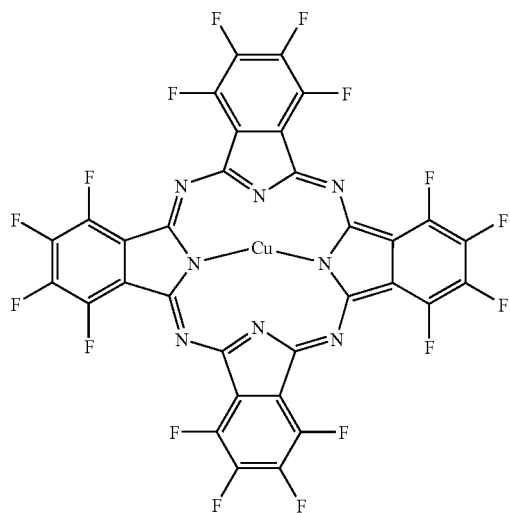
Inv-10
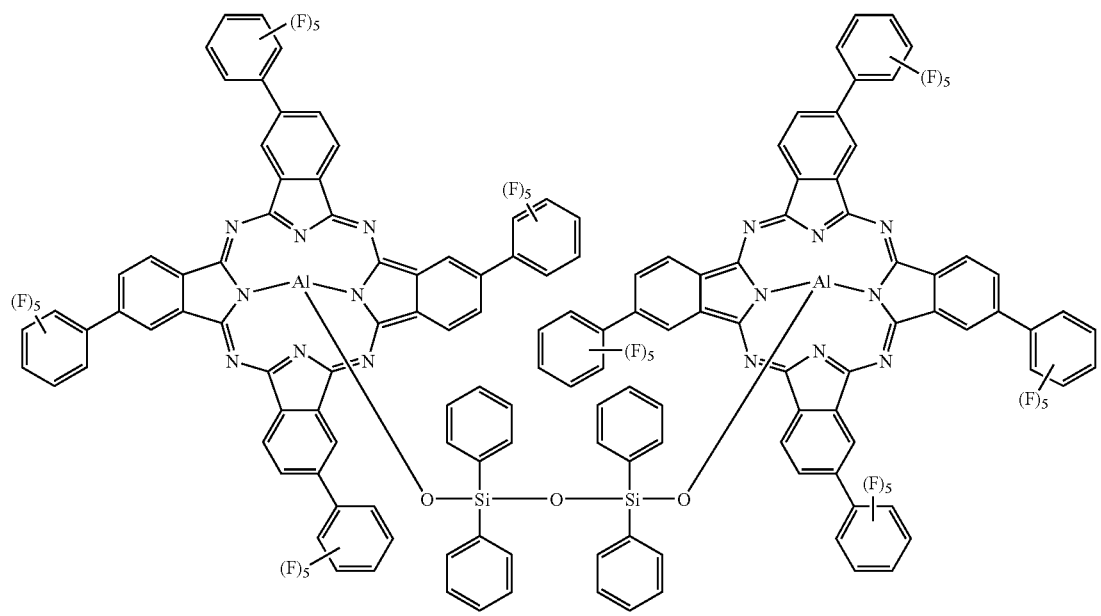

Inv-11

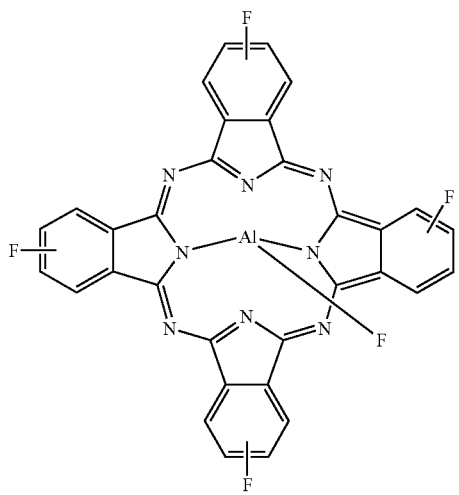

Mixtures of the fluorinated metal phthalocyanine can also be used in combination with other solid pigments during the milling step provided that the fluorinated metal phthalocyanine comprises at least 50 weight percent of the mixture. Illustrative examples include other cyan or blue-green pigments, including non-fluorinated phthalocyanines such as copper phthalocyanine, or pigments with maximum absorbance of less than 620 nm such as Pigment Yellow 185. Preferably, the fluorinated phthalocyanine comprises at least 80%, or even 95%, by weight of the mixture.

Synthesis of a Fluorinated Phthalocyanine:
Inv-1 can be synthesized by the following scheme:

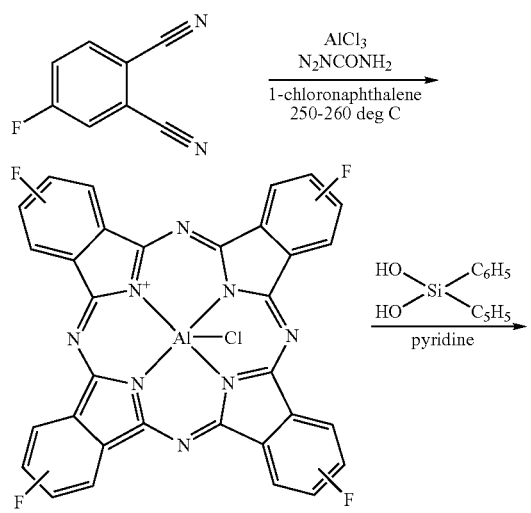

Preparation of Chloroaluminum Tetrafluorophthalocyanine:

Into a 100 mL three neck round bottom flask was placed a magnetic stir bar, 20 grams 1-chloronaphthalene, 0.12 grams (2 mmoles) urea, 9.13 grams (62.5 mmoles) 4-fluorophthalonitrile, then 2.0 grams (15 mmoles) aluminum trichloride and finally 20 grams of 1-chloronaphthalene was used to wash the funnel. The flask was fitted with thermometer and condenser with nitrogen inlet. The reaction was heated with a heating mantle with continuous magnetic stirring. The reaction mixture gradually darkened until some blue-green color is noted at approximately 210 deg.C. At the temperature of 210 deg.C the reaction became exothermic and rapidly heated to reflux at approximately 255 deg.C with concomitant deep blue color formation. The reaction was held at 255 deg.C for 3 hours. After this time a deep blue-black solid had formed and the reaction liquid was brownish which stirred freely. The reaction was cooled to 100 deg.C, then 60 mL of xylene was added and the reaction was stirred for 20 minutes. The mixture was filtered while still warm on a Buchner funnel through Whatman #54 filter paper and a blue-black precipitate was collected. This precipitate was washed with 50 mL of xylene then 100 mL of acetone. The filtrate was initially brownish but gradually changed to light blue. The collected solid was placed in a 250 mL erlenmyer flask, 50 mL of 5% aqueous NaOH was added and the mixture was stirred magnetically for 20 minutes rapidly. The insoluble material was collected on a Buchner funnel. The collected product was washed with 50 mL of acetone then 50 mL of ligroin, then dried on the Buchner funnel. The product was placed back in a 250 mL erlenmyer flask and 50 mL of 5% aqueous $NH_4OH$ was added. This solid is completely non-wetting, that is: the solid remains a completely dry powder on top of the colorless liquid and stirring does not wet the solid. The dry powder was collected on a Buchner funnel. The filtrate was totally colorless. The collected solid was washed with 50 mL of distilled water, 100 mL of acetone, then dried on the Buchner for 20 minutes. After transfer into a 250 mL erlenmyer flask 100 mL of acetone was added. The mixture was brought to boiling with stirring on a hot plate, held at boiling for 15 minutes, then filtered through Whatman #54 filter paper while hot. The filtrate is very light blue. The product was dried on the Buchner funnel for 15 minutes then dried in a vacuum oven at 60 deg.C overnight. The weight of collected intermediate chloroaluminum tetrafluorophthalocyanine as a deep dark blue powder was 9.3 grams (14.3 mmoles, 95.9% yield). Melting point: >310 deg.C.

Preparation of Inv-1, Bis[tetrafluorophthalocyanylalumino]-1,1,3,3-tetraphenyl-1,3-disiloxane Using Diphenylsilanediol Into a 100 mL single neck round bottom flask was placed 5.4 grams (8.3 mmoles) chloroaluminum tetrafluorophthalocyanine, 35 mL pyridine and 1.9 grams (8.5 mmoles) diphenylsilanediol in that order. To the flask was added a magnetic stir bar, equipped with condenser and nitrogen inlet. The flask was placed in an oil bath pre-heated to 130 deg.C. The reaction was stirred and heated at reflux overnight. The chloroaluminum tetrafluorophthalocyanine appeared to dissolve partially in hot pyridine. After stirring overnight the reaction remained deep blue and freely stirring. The flask was removed from the oil bath, cooled to approximately 100 deg.C and the insoluble product was collected on a Buchner funnel using Whatman #54 filter paper (filtered while hot). The collected blue product was washed with 4×50 mL of pyridine until the washes were very light blue, then washed with 100 mL acetone, and 25 mL ligroin P950. The product was dried on the Buchner for one hour then dried in a vacuum oven for one hour at 60 deg.C. The weight of deep blue product was 6.4 grams (3.9 mmoles, 94.3% of theory). Analysis by IR and MS showed small levels of starting material still in this isolated product. The crude product was then placed in a 250 mL erlenmyer flask and slurried with 125 mL dimethylformamide at reflux for 40 minutes. The insoluble material was collected on a Buchner funnel using Whatman #54 filter paper. The hot DMF slurry purification was repeated once. The final product was collected on a Buchner funnel, washed with 50 mL of acetone, and 25 mL of ligroin P950, and then dried in a vacuum oven at 110 deg.C overnight. The collected weight of Inv-1 as a deep blue powder was 4.9 grams (2.99 mmoles, 72.2% of theory). The final product was analyzed by G C mass spectrometry, detecting 2.2% DMF (0.5 mol of DMF/mol of complex). These results were reproducible.

Nanodispersion Formulation in Organic Solvents (Formulation 1):

Inventive Example A: To a 1 L stainless steel cold water jacketed vessel with a specially designed baffle, 244 g of a 1:1 (w/w) solvent mixture comprised of propylene glycol monomethyl ether acetate (PGMEA) and cyclohexanone was introduced along with 11.25 g of dispersant polymer Solsperse 41000. Then, a 50 mm diameter tool steel D blade connected to a vertical Caframo mechanical stirrer was submerged into the solvent. While operating the stirrer at 500 rpm 45 g of Inv-1 was added followed by 600 g of 0.2 mm Zirstar (zirconium silicate milling media). The resulting dispersion was milled by gradually increasing the mixing rate starting with 18 h® 1600 rpm, then ramping to 2800 rpm over 6 h, holding at 2800 rpm for 18 h and finishing with 5 h @ 3000 rpm. The dispersion was isolated after separation from the milling media by pressure filtration through a 20 micron filter.

Comparative Example B: The experiment was executed as above, except Inv-1 was replaced with the analogous non-fluorinated reference material bis(phthalocyanylalumino)tetraphenyldisiloxane (Comp-1) and the starting 1600 rpm mixing rate was extended to 22 h while omitting the 6 h ramp step before 18 h mixing @ 2800 rpm and the final 5 h @ 3000 rpm.

A comparison of the particle size distribution in terms of cumulative % (in terms of volume) below a certain size for Examples A (inventive) and B (comparative) is shown in Table 1. FIG. 1 shows a plot of % volume versus particle size in micrometers. These results clearly show smaller and more uniform particle size distributions for the inventive pigments.

TABLE 1

| | Cumulative % Below in Size | |
|---|---|---|
| nm | Inventive Example A | Comparative Example B |
| 6540 | 100.0 | 100.0 |
| 5500 | 99.3 | 99.9 |
| 4620 | 95.4 | 97.3 |

TABLE 1-continued

| | Cumulative % Below in Size | |
|---|---|---|
| nm | Inventive Example A | Comparative Example B |
| 3890 | 91.1 | 91.4 |
| 3270 | 88.6 | 83.8 |
| 2750 | 87.4 | 76.5 |
| 2310 | 86.6 | 69.8 |
| 1940 | 85.8 | 63.4 |
| 1640 | 85.2 | 56.8 |
| 1380 | 84.6 | 50.0 |
| 1160 | 0.0 | 43.4 |
| 970 | 0.0 | 37.8 |
| 820 | 0.0 | 33.7 |
| 690 | 0.0 | 31.0 |
| 580 | 0.0 | 29.4 |
| 490 | 0.0 | 28.4 |
| 410 | 0.0 | 27.7 |
| 340 | 0.0 | 27.1 |
| 290 | 0.0 | 0.0 |
| 240 | 0.0 | 0.0 |
| 200 | 0.0 | 0.0 |
| 170 | 0.0 | 0.0 |
| 140 | 0.0 | 0.0 |
| 120 | 0.0 | 0.0 |
| 100 | 0.0 | 0.0 |
| 86 | 0.0 | 26.8 |
| 72 | 0.0 | 26.0 |
| 68 | 84.0 | 24.9 |
| 51 | 83.4 | 23.4 |
| 43 | 82.6 | 21.5 |
| 36 | 81.4 | 19.3 |
| 30 | 79.6 | 16.9 |
| 26 | 76.8 | 14.3 |
| 22 | 72.4 | 11.5 |
| 18 | 65.3 | 8.6 |
| 15 | 53.5 | 5.7 |
| 13 | 33.8 | 2.7 |
| 11 | 2.8 | 0.0 |
| 9 | 0.0 | 0.0 |

Nanodispersion Formulation in Organic Solvents (Formulation 2):

Inventive Example C was prepared in the following manner. A 1 L stainless steel cold water jacketed vessel with a specially designed baffle was charged with 7.5 g of dispersant polymer Disperbyk-111 and 129 g of a 1:1 (w/w) mixture of propylene glycol monomethyl ether acetate and cyclohexanone. Then, a 50 mm diameter tool steel D blade connected to a vertical Caframo mechanical stirrer was submerged into the solvent. While operating the stirrer at 500 rpm 13.5 g of Inv-1 was added followed by 150 g of 50 micron polystyrene milling media. The dispersion was milled by gradually increasing the mixing rate using the sequence: 17 h @ 1600 rpm, 3 h @ 2200 rpm, 2 h @ 2400 rpm and 4 h @ 2500 rpm. Milling was discontinued after nanoparticle formation was confirmed using a dynamic light scattering sizing technique.

Comparative Example D: The experiment was executed as outlined in Example C except that Inv-1 was replaced with the reference material bis(phthalocyanylalumino)tetraphenyldisiloxane (Comp-1) and the milling process was extended after no detection of nanoparticle formation. Mixing at 2500 rpm was extended to 25 h.

Figure 2:
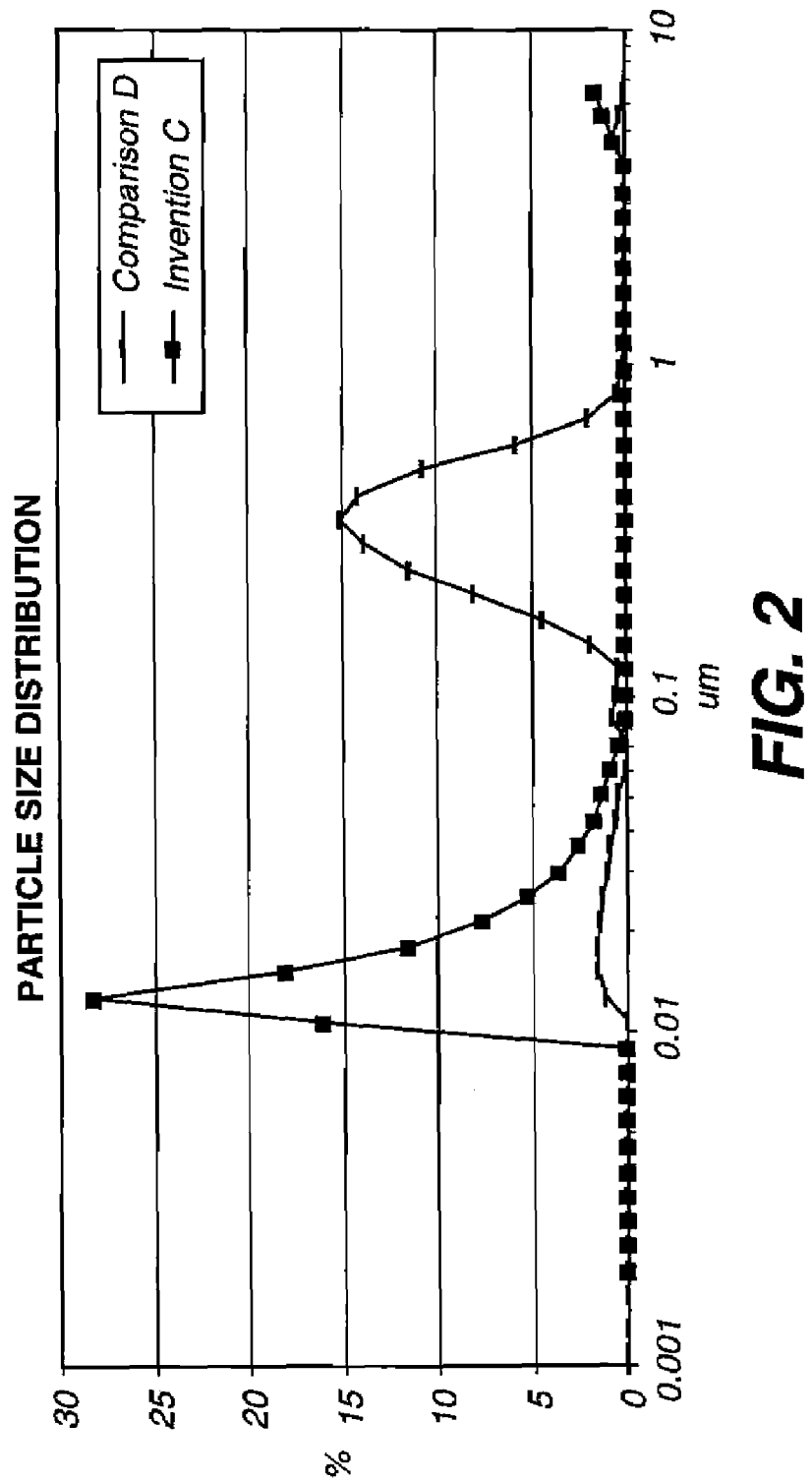

A comparison of the particle size distribution in terms of cumulative % (in terms of volume) below a certain size for Examples C (inventive) and D (comparative) are listed in Table 2. FIG. 2 shows a plot of % volume versus particle size in micrometers. These results clearly show smaller and more uniform particle size distributions for the inventive pigments.

TABLE 2

| | Cumulative % Below in Size | |
| --- | --- | --- |
| nm | Inventive Example C | Comparative Example D |
| 6540 | 100.0 | 0.0 |
| 5500 | 98.5 | 100.0 |
| 4620 | 97.3 | 99.7 |
| 3890 | 0.0 | 0.0 |
| 3270 | 0.0 | 0.0 |
| 2750 | 0.0 | 0.0 |
| 2310 | 0.0 | 0.0 |
| 1940 | 0.0 | 0.0 |
| 1640 | 0.0 | 0.0 |
| 1380 | 0.0 | 0.0 |
| 1160 | 0.0 | 0.0 |
| 970 | 0.0 | 99.0 |
| 820 | 0.0 | 98.7 |
| 690 | 0.0 | 98.3 |
| 580 | 0.0 | 96.3 |
| 490 | 0.0 | 90.6 |
| 410 | 0.0 | 80.0 |
| 340 | 0.0 | 65.8 |
| 290 | 0.0 | 50.8 |
| 240 | 0.0 | 37.0 |
| 200 | 0.0 | 25.6 |
| 170 | 0.0 | 17.6 |
| 140 | 0.0 | 13.3 |
| 120 | 0.0 | 11.5 |
| 100 | 0.0 | 11.0 |
| 86 | 0.0 | 10.4 |
| 72 | 96.8 | 0.0 |
| 68 | 96.3 | 0.0 |
| 51 | 95.5 | 9.7 |
| 43 | 94.3 | 9.4 |
| 36 | 92.5 | 8.7 |
| 30 | 90.1 | 7.9 |
| 26 | 86.5 | 6.9 |
| 22 | 81.3 | 5.7 |
| 18 | 73.7 | 4.3 |
| 15 | 62.1 | 2.7 |
| 13 | 44.1 | 1.2 |
| 11 | 16.0 | 0.0 |
| 9 | 0.0 | 0.0 |

The invention has been described in detail with particular reference to certain preferred embodiments thereof, but it will be understood that variations and modifications can be effected within the spirit and scope of the invention. The patents and other publications referred to are incorporated herein in their entirety.

The invention claimed is:

1. A method for preparing a nanodispersion comprising the steps of:

(i) introducing into a milling apparatus a solid fluorinated phthalocyanine pigment according to Formula (I):

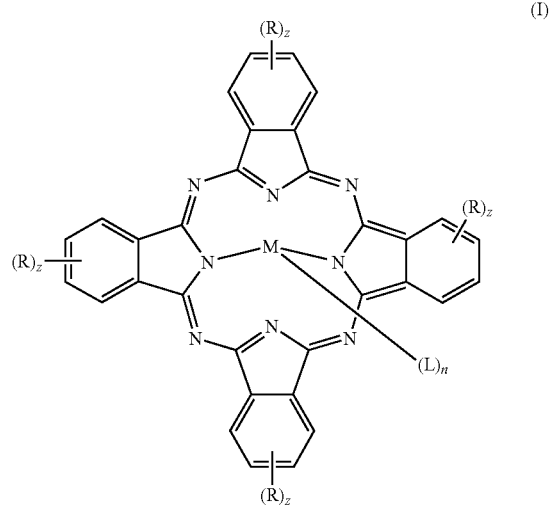

wherein:

M is a metal cation chosen from Groups 1b, 2b, 2a or 3a of the Periodic Table of the Elements;

R is fluorine, a perfluoroalkyl or a perfluoroaryl group;

z is 1 to 4;

L is an anionic ligand; and n is 0 or 1 such that overall charge on molecular unit is neutral; and (ii) milling with agitation the solid fluorinated phthalocyanine in an organic solvent into a suspension of particles so that at least 80 volume % of the particles have a particle size of less than 100 nm.

2. The method of claim 1, where the fluorinated phthalocyanine is according to Formula (II):

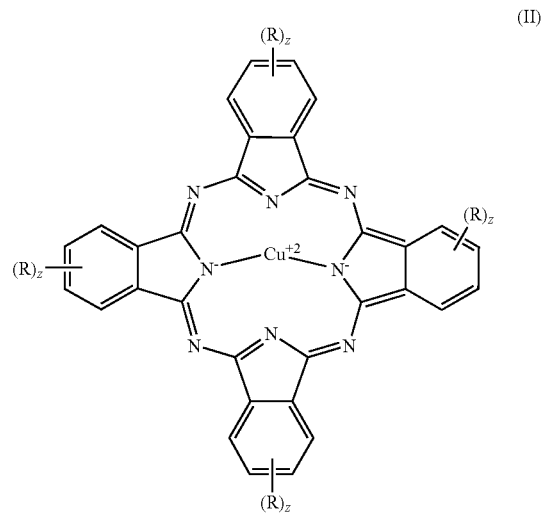

wherein R is fluoro or trifluoromethyl and z is 1-4.

3. The method of claim 2, wherein R is fluoro and z is 1.

4. The method of claim 1, where the fluorinated phthalocyanine is according to Formula (III):

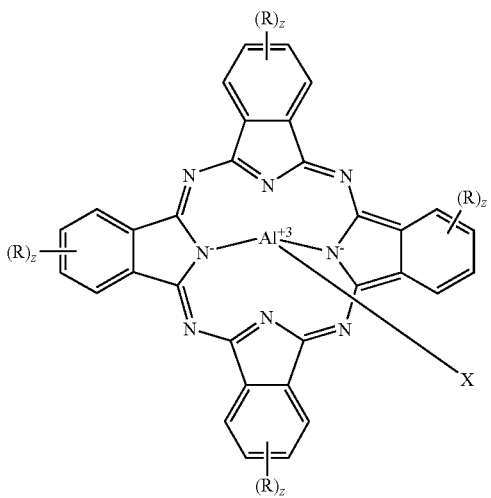

(III)

wherein:
R is fluoro or trifluoromethyl;
z is 1-4; and
X is a halide, hydroxide, —O—, —O—Si(R)$_2$—O—Si(R)$_2$—O—, or —O—Si(R)$_2$—R—Si(R)$_2$—O— where R is independently alkyl or aryl.

5. The method of claim 4, wherein R is fluoro, z is 1 and X is —O—Si(R)$_2$—O—Si(R)$_2$—O— where R is independently alkyl or aryl.

6. The method of claim 1, wherein the milling step includes a solid milling media which can be separated from the nanodispersion.

7. The method of claim 6, wherein the milling media is a polymeric resin or a ceramic particle.

8. The method of claim 1, wherein at least 75 volume % of the particles have a particle size of less than 30 nm.

9. The method of claim 1, wherein at least 70 volume % of the particles have a particle size of less than 22 nm.

10. The method of claim 1, wherein at least 65 volume % of the particles have a particle size of less than 18 nm.

11. The method of claim 1, wherein the organic solvent has a gamma$_c$ hydrogen bonding parameter of at least 8.0.

12. The method of claim 11, wherein the organic solvent is selected from ketones, amides, alcohols, polyols, ethers and esters.

13. The method of claim 12, wherein the milling step includes a dispersion agent selected from sulfates, sulfonates, acrylic and styrene-acrylic copolymers, sulfonated polyesters and styrenics, phosphorated polyesters and dispersion agents that contain amine, acidic or polyether functional groups.

14. The method of claim 1, wherein the milling step includes another solid pigment provided that the fluorinated metal phthalocycanine comprises at least 50 weight percent of the mixture.

* * * * *

UNITED STATES PATENT AND TRADEMARK OFFICE
CERTIFICATE OF CORRECTION

PATENT NO. : 7,585,363 B1
APPLICATION NO. : 12/260127
DATED : September 8, 2009
INVENTOR(S) : Tommie L. Royster, Jr. et al.

Page 1 of 1

It is certified that error appears in the above-identified patent and that said Letters Patent is hereby corrected as shown below:

| | |
|---|---|
| Title Page, Col. 1, Line 4 (Other Publications) | Delete "A." and insert -- A --, therefor. |
| Title Page, Col. 2, Line 3 (Abstract) | Delete "phthalocycanine" and insert -- phthalocyanine --, therefor. |
| Title Page, Col. 2, Line 5 (Abstract) item [57] | Delete "Wherein" and insert -- wherein --, therefor. |
| Column 24, Line 27 | In Claim 14, delete "phthalocycanine" and insert -- phthalocyanine --, therefor. |

Signed and Sealed this

Twenty-sixth Day of January, 2010

David J. Kappos
*Director of the United States Patent and Trademark Office*